Figure 1:
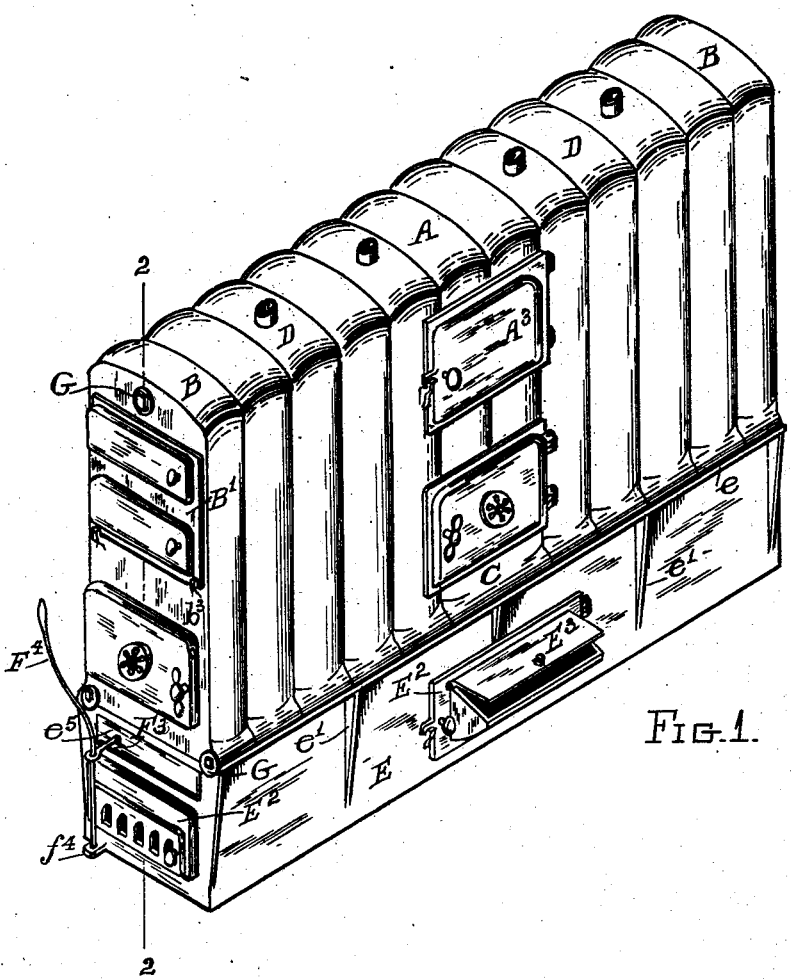

No. 739,503. PATENTED SEPT. 22, 1903.
J. N. MURPHY.
HEATING APPARATUS.
APPLICATION FILED MAY 6, 1902.

NO MODEL. 5 SHEETS—SHEET 1.

WITNESSES.
R. H. Dooling.
Mary F. Ryan

INVENTOR.
John N Murphy.
By Atty N. DuBois.

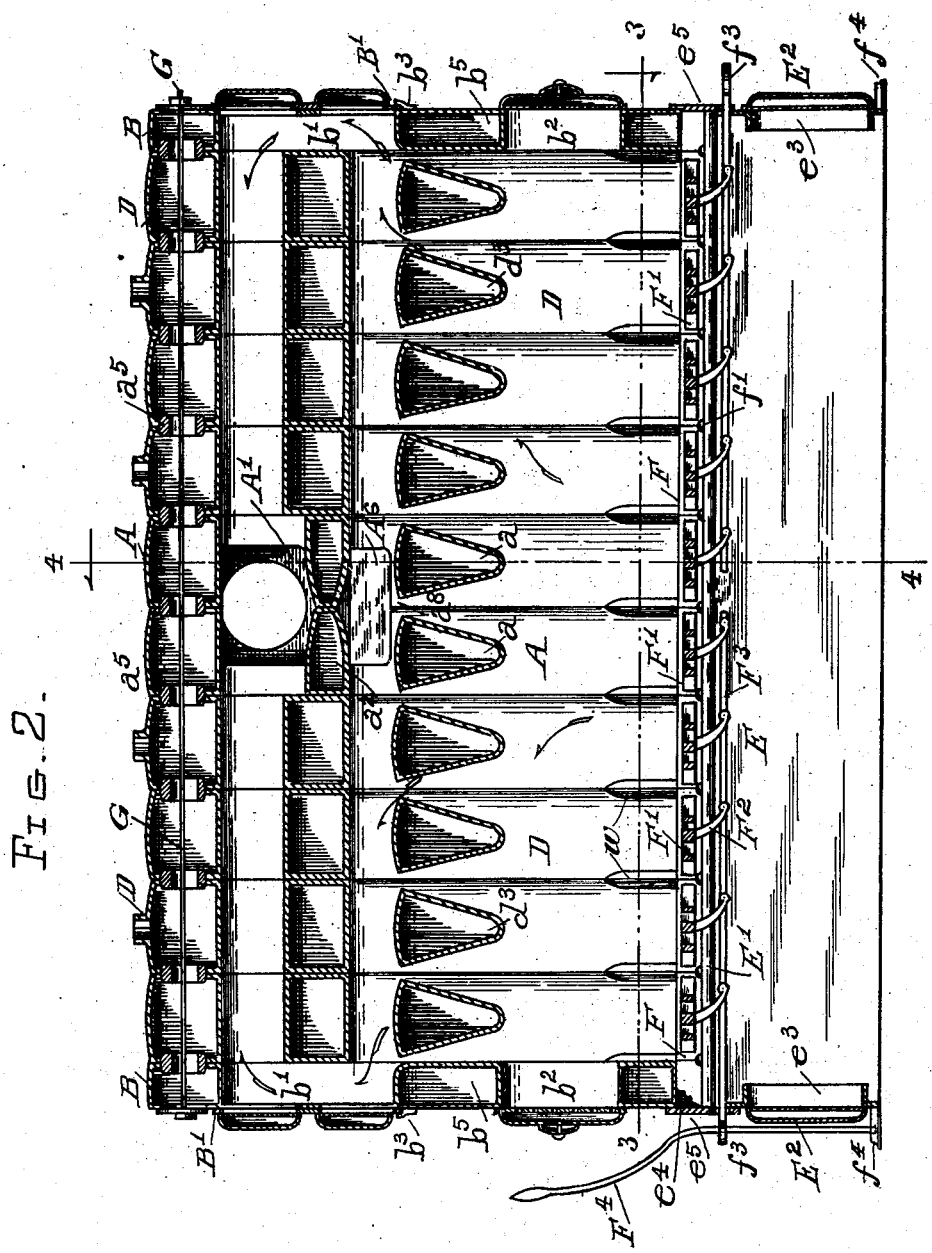

No. 739,503. PATENTED SEPT. 22, 1903.
J. N. MURPHY.
HEATING APPARATUS.
APPLICATION FILED MAY 6, 1902.
NO MODEL. 5 SHEETS—SHEET 3.

WITNESSES.
R. H. Dooling,
Mary F. Ryan

INVENTOR.
John N. Murphy,
By Atty N. DuBois.

No. 739,503. PATENTED SEPT. 22, 1903.
J. N. MURPHY.
HEATING APPARATUS.
APPLICATION FILED MAY 6, 1902.
NO MODEL. 5 SHEETS—SHEET 4.
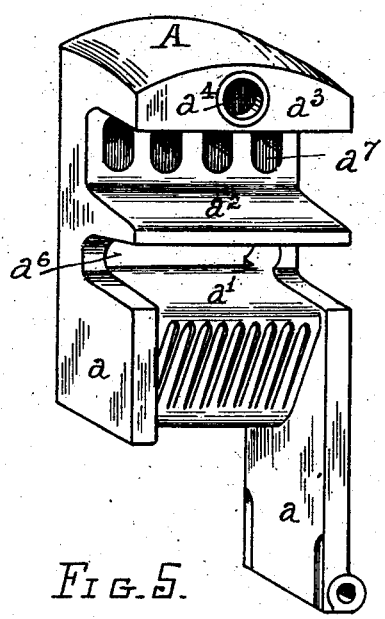
Fig. 5.
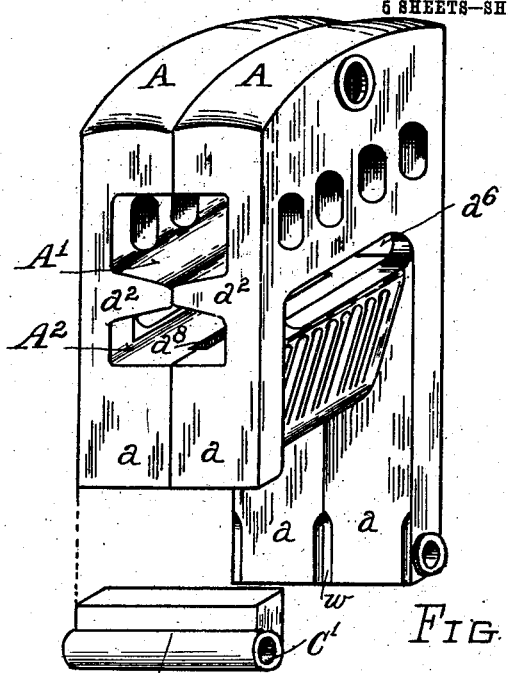
Fig. 6.
Fig. 7.
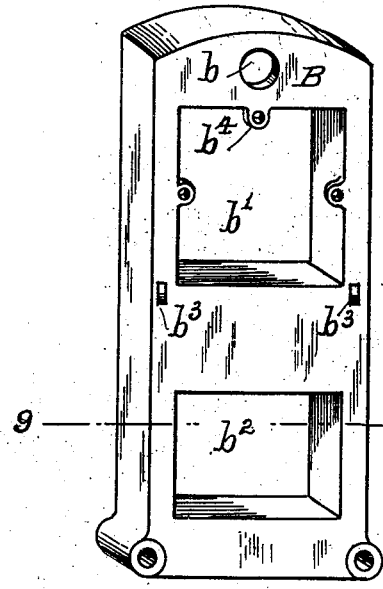
Fig. 8.
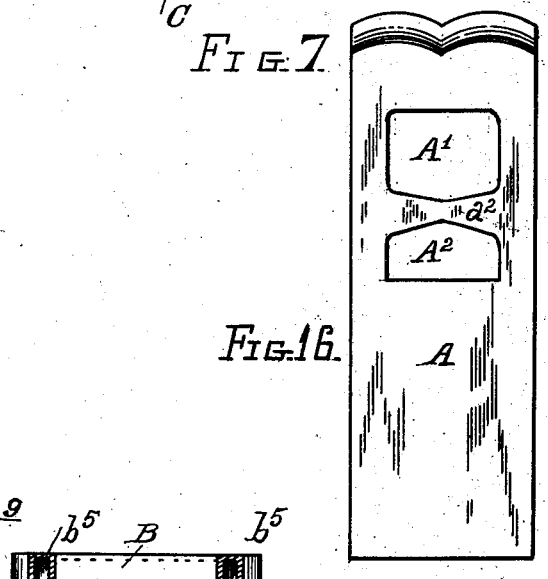
Fig. 16.
Fig. 9.
WITNESSES.
R. H. Dooling.
Mary F. Ryan.
INVENTOR.
John N. Murphy.
By Atty N. DuBois.

No. 739,503. PATENTED SEPT. 22, 1903.
J. N. MURPHY.
HEATING APPARATUS.
APPLICATION FILED MAY 6, 1902.
NO MODEL. 5 SHEETS—SHEET 5.
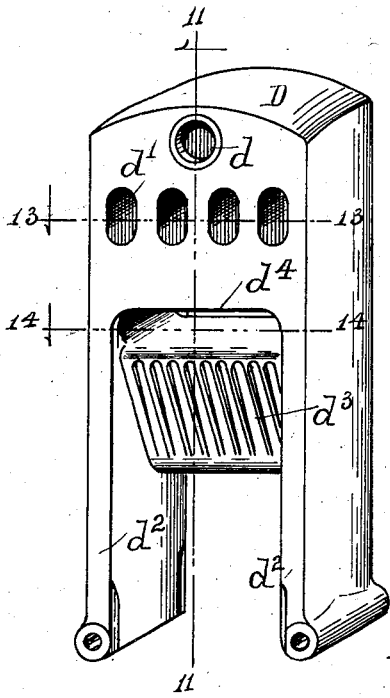
Fig. 10.
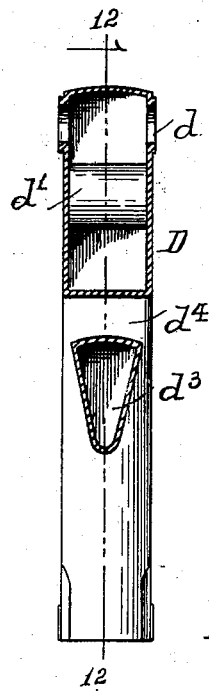
Fig. 11.
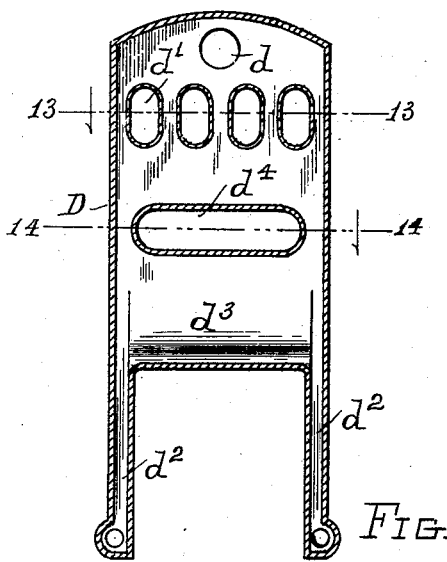
Fig. 12.
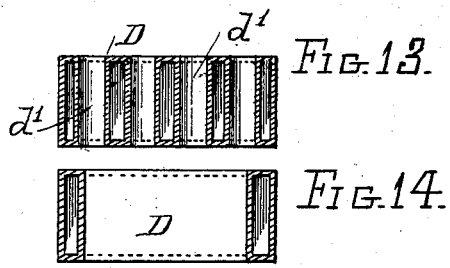
Fig. 13.
Fig. 14.
WITNESSES.
R. H. Dooling,
Mary F. Ryan
INVENTOR.
John N Murphy
By Atty N. DuBois No. 739,503. Patented September 22, 1903.

UNITED STATES PATENT OFFICE.

JOHN N. MURPHY, OF SPRINGFIELD, ILLINOIS.

HEATING APPARATUS.

SPECIFICATION forming part of Letters Patent No. 739,503, dated September 22, 1903.

Application filed May 6, 1902. Serial No. 106,158. (No model.)

*To all whom it may concern:*

Be it known that I, JOHN N. MURPHY, a citizen of the United States, residing at Springfield, in the county of Sangamon and State of Illinois, have invented certain new and useful Improvements in Heating Apparatus, of which the following is such a full, clear, and exact description as will enable others skilled in the art to which it appertains to make and use my said invention.

My invention relates to heating apparatus of that class in which hot water or steam is used as the heating medium.

The general purpose of my invention is to provide a heating apparatus so constructed and arranged that the draft-currents within the apparatus will diverge from the center of the fire-box toward the ends of the apparatus and will then converge from the ends toward the center and unite in a common central flue or exit. Keeping this general purpose in view, the more specific purposes of my invention are to provide a heating apparatus consisting of a series of sections so constructed and arranged that the firing may be done either from the front or from either end of said apparatus; to provide a section for heating apparatus having a conduit intercommunicating with the water-legs of said section, said section being so constructed and arranged that when a number of such sections are assembled in a heating apparatus said conduits will lie within and extend across the fire-box of the apparatus in such manner that substantially the entire outer surface of the walls of said conduits will be exposed to the direct action of the fire; to provide a heating apparatus having a series of sections provided with conduits, said sections being so disposed relative to each other as to leave spaces between the conduits through which flames and the products of combustion pass into that part of the fire-box above the conduits; to provide a heating apparatus consisting of a central section or sections, intermediate sections, and end sections so constructed and arranged that when said sections are assembled the draft of the apparatus will be from the lower chamber of the fire-box upward between the conduits into the upper chamber of the fire-box, thence outwardly and divergently from the center through ways in the end sections into longitudinal flues or ways opening into a common central flue, and thence through said central flue to the exit, said sections being so constructed and arranged as to equalize the draft through the ways in the end sections; to provide a central section, an intermediate section, and an end section, all of new and useful form and adapted to be assembled in a unitary structure having a central draft, substantially as hereinafter explained; to provide means for facilitating the circulation of water through the central sections and the intermediate sections of the apparatus; to provide a section for heating apparatus of a form adapted to facilitate the insertion or removal of the grate-bars of the apparatus, and to provide a grate-supporting device of novel and improved construction.

With these ends in view my invention consists of the novel features of construction and combinations of parts shown in the annexed drawings, to which reference is hereby made and hereinafter particularly described, and finally recited in the claims.

Figure 15:
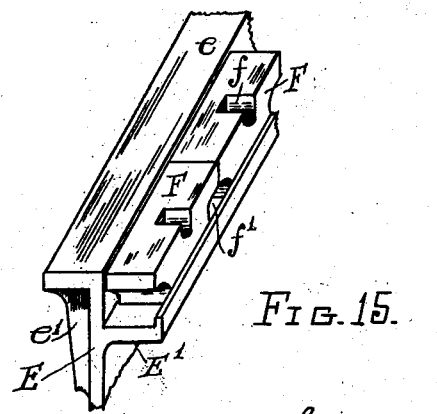
Figure 3:
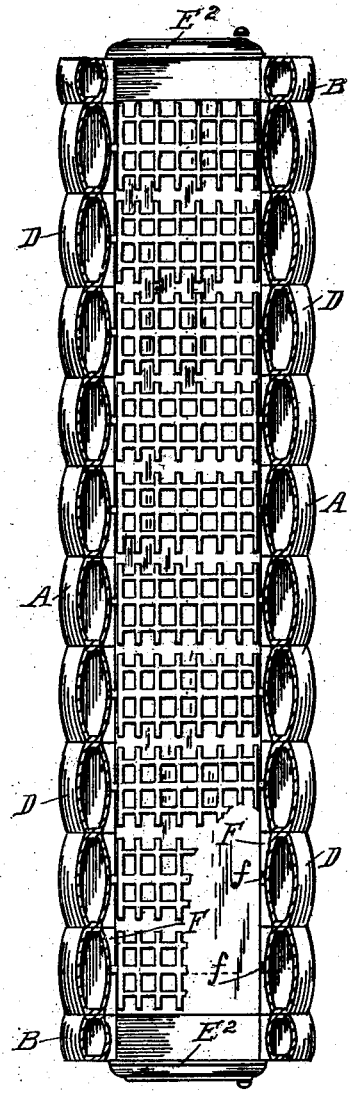
Figure 4:
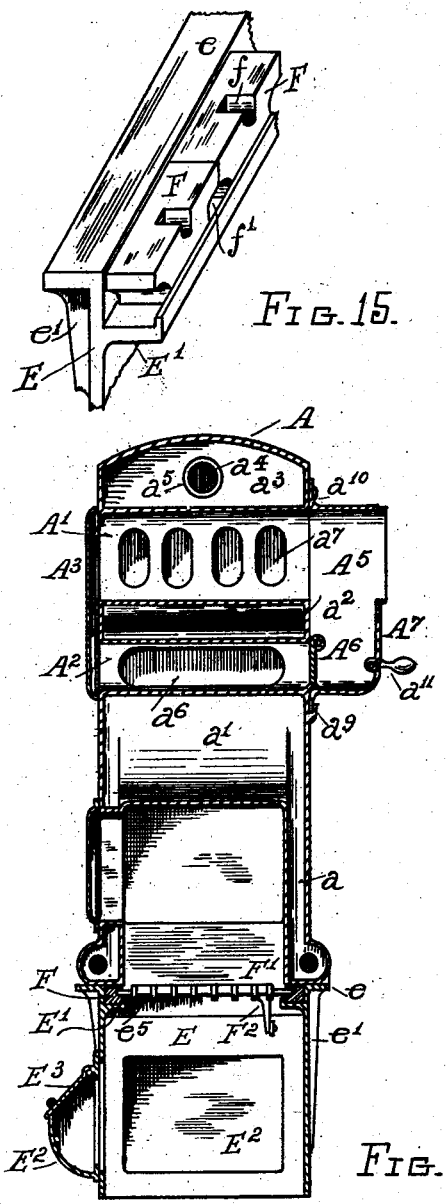

Referring to the drawings, Figure 1 is a perspective view of the complete apparatus. Fig. 2 is a vertical longitudinal section on the line 2 2 of Fig. 1. Fig. 3 is a horizontal longitudinal section on the line 3 3 of Fig. 2. Fig. 4 is a vertical transverse section on the line 4 4 of Fig. 2. Fig. 5 is a perspective view of one of the central sections detached. Fig. 6 is a perspective view of a pair of central sections in operative position relative to each other and shows the central flues formed by the union of the sections. Fig. 7 is a perspective view of the filling-block usable with the central sections. Fig. 8 is a perspective view of one of the end sections. Fig. 9 is a horizontal transverse section on the line 9 9 of Fig. 8. Fig. 10 is a perspective view of one of the intermediate sections. Fig. 11 is a vertical longitudinal section on the line 11 11 of Fig. 10. Fig. 12 is a vertical longitudinal section through the heater-section on the line 12 12 of Fig. 11. Figs. 13 and 14 are horizontal transverse sections on the lines 13 13 and 14 14, respectively, of Fig. 10. Fig. 15 is an enlarged perspective view of a part of one of the side walls of the ash-pit and shows two of the grate-blocks in position on the ledge of the side wall. Fig. 16 is a front elevation of an alternative form of the central section.

Similar reference characters designate like parts in the several views of the drawings.

The essential elements of the apparatus are a central section or sections, end sections, and intermediate sections interposed between the end sections and the central section or sections, and means for uniting all of said sections to form an operative apparatus.

There are three classes of sections, and all of the sections in any one class are exactly alike except as hereinafter set forth. A detail description of one section in each class will therefore suffice to clearly explain the essential structural features of all of the sections.

The central section A in its preferable form consists of a box-shaped casting having hollow legs $a$, a hollow conduit $a'$, intercommunicating with the interior of the legs, an integral lateral hollow tongue $a^2$ approximately central to the body of the section, and a hollow upper part $a^3$, pierced by holes $a^4$, adapted to receive suitable nipples $a^5$, used to connect the sections with each other, so as to permit free circulation of water or steam through the sections. Between the conduit $a'$ and the tongue $a^2$ is an opening $a^6$, forming a passage-way between the conduit and the tongue, the use of which will be hereinafter explained. Flues $a^7$ extend transversely through the section. The front faces of the parts $a$, $a^2$, and $a^3$ are all flush, so that the sections will fit closely together, as shown in Fig. 6. The width of the conduit $a'$ is less than the width of the legs $a$. When two or more sections are joined, as shown in Fig. 6, there will be openings $a^8$ between the adjacent conduits intercommunicating with the lower part and the upper part of the fire-box, as hereinafter more fully explained. I have shown in the drawings a central section of such shape that when a pair of sections are placed in juxtaposition, as shown, the walls of the parts $a^2$ and $a^3$ will form a central flue A′, one-half of the flue being in each section. The front edges of the tongues will abut against each other. The lower surfaces of the tongues of all the sections combined in the apparatus will form the crown of the fire-box. The space between the parts $a^2$ and the upper ends of the parts $a$ will form openings or ways A$^2$, one-half of each opening being in each section, and the spaces between the conduits will form ways $a^8$, through which the fire comes in direct contact with the under surface of the tongues and also in direct contact with practically the whole of the external surfaces of the conduits.

By employing sections substantially of the form described I produce a fire-box having an upper and a lower chamber with free communication between them, said fire-box being traversed by conduits having large heating-surfaces in direct contact with the fire.

The section A preferably has one water-leg of about the same length as the water-legs of sections commonly used in similar apparatus, the other leg being shorter, so as to permit the use of a filling-block C and leave a door-opening between the filling-block and the short legs of the other two central sections.

The filling-block C is a hollow casting of a length equal to the width of the two central sections and has openings C′, through which water-circulation is maintained between the sections D, contiguous to the block. Where central sections are used which have water-legs of unequal length, the block serves to fill the space under the fuel-door, which is mounted on the central sections.

It is obvious that instead of using a pair of sections in conjunction, forming a central flue and door-openings, I may without departing from my invention use a single central section having a central flue and door-openings—such, for example, as is shown in front elevation in Fig. 16—and combinable with end sections and intermediate sections, substantially as herein set forth.

The front end of the central flue A′ and the front opening of the way A$^2$ are closed by a door A$^3$, mounted on the section or sections A.

On the back of the section are lugs $a^9$, (see Fig. 4,) which support a smoke-box A$^5$, which is secured on the section by screws $a^{10}$ or equivalent securing devices, and the flue A′ and the way A$^2$ communicate with the smoke-box. An oscillative damper A$^6$ is mounted on the smoke-box and extends across the rear end of the way A$^2$. When the damper is down, as shown in Figs. 2 and 4, the draft-currents will diverge from the center through the upper chamber of the fire-box, through the openings $b'$ into the longitudinal flues, thence to the central flue A′, and thence through the smoke-box to the chimney. If the damper is raised there will be direct draft from the fire-box to the smoke-box and thence to the chimney.

In the back of the smoke-box is a check-draft door A$^7$, having a heavy handle $a^{11}$, which gravitates to close the door. By raising the handle the door may be opened to check the draft through the smoke-box to any desired extent.

The end section consists of a hollow casting B. (Clearly shown in its preferable form in Figs. 2, 8, and 9.) The section is pierced by nipple-openings $b$, registering with the corresponding openings in the other sections. Openings $b'$ and $b^2$ extend transversely through the section. When the sections are assembled, the opening $b'$ is in line and communicates with the upper chamber of the fire-box and also with the longitudinal flues, which communicate with the central flue A′. The opening $b^2$ communicates with the lower part of the fire-box. Lugs $b^3$ serve to support the door-frame B′ on the section. Lugs $b^4$ receive bolts or other securing devices for securing the door-frame on the section. Water-space $b^5$ extends entirely around the openings $b'$ and $b^2$. The intermediate section D is a hollow casting, preferably of the form shown in Figs. 10 to 14, inclusive, and has nipple-openings $d$, transverse flues $d'$, water-legs $d^2$, conduits $d^3$, and openings $d^4$, which register with and have the same functions as the corresponding parts and openings of the sections A and B.

When sections A, B, and D are assembled in a heating apparatus, the flues $d'$, in conjunction with the flues $a^7$, form a series of parallel longitudinal flues extending inward from the ends of the apparatus and terminating in the central flue A'. I preferably employ a series of flues such as I have just described; but I may, without departing from my invention, dispense with the divisional spaces between the flues and use a single transverse flue of suitable dimensions through each section and unite the sections so as to form two longitudinal flues, one on each side of the center, leading from the ends of the apparatus into the central flue A'.

The inside edges of the legs of the sections A and D are chamfered near the ends of the legs, so that when two sections are in juxtaposition the adjacent chamfered parts will form ways $w$, (see Figs. 2 and 6,) through which the ends of the grate-bars may pass, so that the grate-bars may be inserted or removed without dismounting the sections.

The sections A, B, and D are assembled and mounted on a rectangular frame E, having a ledge $e$, on which the lower ends of the sections rest, and having ribs $e'$ for strengthening the frame. When assembled as described, all of the sections are secured together by bolts G or equivalent securing devices. On the inner side walls of the frame are inwardly-projecting ledges E', on which the grate-blocks F are slidable.

The frame E has at the center of its front and at each end door-openings $e^3$, supplied with suitable doors E$^2$, mounted on the frame A. A draft-controlling door E$^3$ is mounted on the central door E$^2$.

At each end of the frame is an opening $e^4$, suitable for the insertion of the grate-blocks and provided with a suitable closure $e^5$.

The preferable form of the grate-blocks and the means for supporting them on the frame are clearly shown in Fig. 15.

I have shown in the drawings an apparatus embracing two central sections joined to form a central flue, two end sections, and eight intermediate sections, having openings registering with openings in the central sections and end sections to form longitudinal flues leading into the central flue; but I may use a greater or a less number of intermediate sections without departing from my invention.

By employing sections of the form described, combinable substantially as set forth, I produce a heating apparatus having unusually large surface in direct contact with the fire; also having the great practical advantage that instead of having to pull through flues extending the entire length of the apparatus the draft is divided, so as to pull from each end toward the center, and thence through a central flue to the exit, thereby greatly improving the directness and quality of the draft; also having the practical advantage that the apparatus is adapted for firing from the center or from either or both ends, according to the size of the apparatus or the conditions of its use, and having the further advantage that the capacity of the apparatus may be readily enlarged or reduced by adding or taking off sections, as occasion may require, without impairing the effectiveness of the apparatus.

Having fully described my invention, what I claim as new, and desire to secure by Letters Patent, is—

1. A section for heating apparatus comprising a tongue extending from the front to the rear of the section, the side walls of said tongue being flush with the side walls of the section, flues transverse to said section, water-space above and around said flues, water-legs, a conduit connecting said water-legs, the width of said conduit being less than the width of the section, and a way between said tongue and said conduit, as set forth.

2. A section for heating apparatus having a tongue and transverse flues so constructed and arranged that a pair of said sections in conjunction will form a central lateral flue lying above and extending the full length of the tongue and into which the transverse flues of said sections open, as set forth.

3. A section for heating apparatus, having transverse flues, a tongue, a conduit and a way between said tongue and said conduit and combinable with a similar section to form a central flue into which the transverse flues of said sections open and a central opening with which the ways in said sections communicate, as set forth.

4. In a heating apparatus, the combination of a series of sections having water-legs, conduits connecting said water-legs, transverse ways above said conduits and transverse flues above said ways; said sections being conjoined to form a structure having a central flue extending from front to rear of the structure, flues extending lengthwise of the structure and communicating with said central flue, a central opening underlying said central flue, ways above said conduits communicating with said central opening and ways between said conduits communicating with said central opening, as set forth.

5. In a heating apparatus, the combination of central sections having transverse flues, tongues, ways and conduits, intermediate sections having transverse flues ways and conduits, the flues and ways in said central sections and intermediate sections being respectively in registry with each other, and end sections having openings communicating with the flues and the ways in said intermediate sections; all conjoined to form an apparatus having longitudinal flues opening into a common central flue, a central opening under said central flue and openings between said conduits communicating with said central opening, as set forth.

6. A heating apparatus having a two-chamber fire-box, conduits transverse to said fire-box, openings between said conduits, a central flue and longitudinal flues communicating with said central flue and also communicating with both the upper and the lower compartment of said fire-box, as set forth.

7. A heating apparatus having a two-chamber fire-box, conduits transverse to the fire-box, openings between said conduits, a central flue, longitudinal flues intercommunicating with both compartments of the fire-box and with the central flue, a smoke-box intercommunicating with the central flue and the fire-box and a damper controlling communication between the fire-box and the smoke-box, as set forth.

8. In a heating apparatus the combination of central sections, intermediate sections and end sections substantially of the form described; fuel-doors and cleaning-doors mounted on said end sections and a fuel-door and cleaning-doors mounted on said central sections, as set forth.

In witness whereof I have hereunto subscribed my name and affixed my seal, at Springfield, Illinois, this 2d day of April, 1902.

JOHN N. MURPHY. [L. S.]

Witnesses:
 N. Du Bois,
 May F. Ryan.